(12) United States Patent
Lehoux

(10) Patent No.: US 8,909,923 B2
(45) Date of Patent: Dec. 9, 2014

(54) SECURITY METHOD, ASSOCIATED CHIP CARD, MODULE AND TERMINAL

(75) Inventor: Renaud Lehoux, Antony (FR)

(73) Assignee: ERCOM, Velizy Villacoublay (FR)

( * ) Notice: Subject to any disclaimer, the term of this patent is extended or adjusted under 35 U.S.C. 154(b) by 168 days.

(21) Appl. No.: 13/704,913

(22) PCT Filed: Jun. 10, 2011

(86) PCT No.: PCT/FR2011/051326
§ 371 (c)(1),
(2), (4) Date: Jan. 18, 2013

(87) PCT Pub. No.: WO2011/161355
PCT Pub. Date: Dec. 29, 2011

(65) Prior Publication Data
US 2013/0117562 A1 May 9, 2013

(30) Foreign Application Priority Data

Jun. 22, 2010 (FR) ...................................... 10 54966

(51) Int. Cl.
| | | |
|---|---|---|
| H04L 29/06 | (2006.01) | |
| G06F 21/71 | (2013.01) | |
| G06F 21/34 | (2013.01) | |
| H04M 1/67 | (2006.01) | |
| H04W 88/02 | (2009.01) | |
| H04M 1/725 | (2006.01) | |

(52) U.S. Cl.
CPC ................ *G06F 21/71* (2013.01); *G06F 21/34* (2013.01); *H04W 88/02* (2013.01); *H04M 1/72527* (2013.01); *H04L 63/0853* (2013.01); *H04M 1/67* (2013.01)
USPC ......................................................... 713/164

(58) Field of Classification Search
CPC ..... G06F 21/71; G06F 21/34; G06F 15/7807; H04L 63/0853; H04L 9/0822; H04L 9/0816; H04L 49/109; H04M 1/72527
See application file for complete search history.

(56) References Cited

U.S. PATENT DOCUMENTS

| | | | |
|---|---|---|---|
| 8,285,989 B2* | 10/2012 | Lucidarme et al. ........... | 713/168 |
| 8,423,768 B2* | 4/2013 | Huang et al. ................... | 713/168 |
| 2009/0070583 A1* | 3/2009 | von Mueller et al. ......... | 713/168 |
| 2010/0052290 A1* | 3/2010 | McCune .................... | 280/455.1 |
| 2010/0096452 A1* | 4/2010 | Habraken ...................... | 235/382 |
| 2010/0100724 A1* | 4/2010 | Kaliski, Jr. .................... | 713/155 |

FOREIGN PATENT DOCUMENTS

WO      WO02/069655 A2     9/2002

* cited by examiner

*Primary Examiner* — Krisna Lim
(74) *Attorney, Agent, or Firm* — Im IP Law PLLC; C. Andrew Im

(57) ABSTRACT

A security method in a terminal comprising a chip card offering secure functions, a user interface, a module for interfacing with the chip card and suitable for shutting down or introducing the electrical supply to the chip card. After shutdown of the chip card with the terming being kept on, the interface module introduces the electrical supply to the chip card, encrypts a command for resumption of utilization of the secure functions with a negotiated key stored by the interfacing module, and dispatches the encrypted command to the chip card. The interface module utilizes the secure functions of the chip card when the resumption command decrypted by the chip card is recognized as a resumption command by the chip card.

12 Claims, 1 Drawing Sheet

SECURITY METHOD, ASSOCIATED CHIP CARD, MODULE AND TERMINAL

RELATED APPLICATIONS

This application is a §371 application from PCT/FR2011/051326 filed Jun. 10, 2011, which claims priority from French Patent Application No. 10 54966 filed Jun. 22, 2010, each of which is incorporated herein by reference in its entirety.

TECHNICAL FILED OF THE INVENTION

This invention relates to the utilization of data stored on a chip card in a secure terminal. The terminal is, for example, a mobile terminal on a mobile telecommunications network, such as a PDA or a mobile phone.

BACKGROUND OF THE INVENTION

In such a case, the terminal must regularly use secure functions provided by the chip card, such as to re-authenticate or renegotiate a periodic key between the terminal and a network server after the connection between the terminal and the server was broken, in order to maintain a service, such as receiving email, receiving telephone calls, etc. or even receiving a secure incoming call, in order to authenticate between the local terminal and the remote terminal.

For the terminal's software applications and hardware modules to access the secure functions on the chip card, and use them, the user is required to enter a code, called a PIN ("Personal Identification Number") code. This code, a personal identification number or secret code, is a sequence of digits intended to authenticate the user, the owner of a chip card.

The code protects the chip card against any unauthorized use. For example, after the user enters three incorrect PINs, the mobile terminal locks and must be unlocked by an administrator.

Once the secure functions on the chip card are used to implement a current operation by the terminal, it is common to cut the power to the chip card, for the purpose of reducing the consumption of electric power.

However, this power shutdown involves re-entering the PIN code during a new call, by a terminal application, to a secure function on the card.

If these protected functions must be used frequently, there are several options that may be used to address this problem.

For example, it is possible to ask the user to re-enter the PIN code for the chip card each time a secure function on the card is called.

It is also possible to ask the user to re-enter the PIN code each time the device exits a period of inactivity so as to keep the card unlocked as long as the terminal is in use and to cut the power to the card after a certain amount of time has elapsed without interaction by the user, such as when the terminal enters standby mode. One possible solution is also to remove the PIN code.

Another solution would be to store the PIN code on the terminal itself, in extra memory outside of the chip card (so that the terminal can unlock the chip card itself without requiring the user to enter the PIN code).

One solution would be to reduce access to the chip card, such as by using a longer cryptoperiod.

One solution would be to continuously maintain the power to the chip card, even during periods of terminal inactivity, as is done for the SIM ("Subscriber Identity Module") card, which is used in GSM networks.

However, each of these possible solutions has significant disadvantages.

It is cumbersome for the user to enter the PIN code each time a protected function on the card is called by the terminal, especially when such functions must be called without a prior action by the user. It is then necessary to alert the user frequently in order to maintain the service, which is highly cumbersome. Similarly, it is rather inconvenient to require the user to enter a PIN code whenever a secure call is received, particularly due to the risk of skipping the call due to the time spent entering the code.

The variation consisting of entering the PIN code each time the device exits a period of inactivity poses a problem because, if a period of inactivity lasts longer than the maximum re-authentication period allowed by the server, the service will be disrupted. Moreover, this approach does not solve the problem of receiving secure calls.

Removing the PIN code presents a major security problem because access to the chip card is no longer protected.

Storing the PIN code on the terminal outside of the chip card presents a major security risk because there is sensitive data stored in an unprotected location.

Reducing how many times the card is accessed has an impact on security, since the keys used for exchanges between the network (server) and the terminal would be regenerated less often.

Continuously maintaining power to the chip card has two disadvantages. First, doing this consumes electric power, and second, such a solution presents a security risk. When the terminal is inactive, an attacker could extract the card from the device while maintaining power in order to access the data or protected functions on the chip card.

OBJECT AND SUMMARY OF THE INVENTION

The invention provides a solution for reducing how much power is consumed by cutting power to the chip card when the terminal does not need to access secure functions on the card, all while maintaining security.

As such, according to a first aspect, the invention provides a security method in a terminal comprising a chip card offering secure functions, a user interface, a module for interfacing with the chip card and suitable for at least shutting down or implementing the electrical supply to the chip card, the method comprising the following steps:

receipt of a code through the terminal's user interface;
supply of said code to the chip card via the interfacing module;
verification by the chip card that the code is equal to a code for accessing the card stored on the chip card, and only in the positive case, utilization by the interfacing module of secure functions offered by the chip card;
then, negotiation between the interfacing module and the chip card of at least one key and storage of at least said negotiated key by the interfacing module and by the chip card;

and according to which, after a shutdown, followed by a reimplementation of the electrical supply to the chip card by the interfacing module, the terminal being kept switched on, the method comprising the following steps:

(i) encryption of a command for resumption of utilization by the interfacing module of functions made secure by the interfacing module with a negotiated key stored by the interfacing module and dispatching of said encrypted command to the chip card;

(ii) receipt by the chip card of said encrypted command and decryption of said encrypted command by the negotiated key stored on the chip card;

(iii) then, utilization by the interfacing module of secure functions offered by the chip card, only if the resumption command decrypted by the chip card is recognized as a resumption command by the chip card.

This solution has the following advantages:

The PIN code is not stored on the terminal outside of the chip card.

The power to the chip card can be cut without an impact to the operation or ergonomics of the terminal.

The user only has to enter a PIN code at the start of the action.

There is limited sensitive data regarding the chip card's secure functions that is stored on the terminal itself outside of the chip card.

The communication channel between the terminal and the card is encrypted.

In one embodiment, the steps (i), (ii), and (iii) are performed at each occurrence of a shutdown, followed by a reimplementation of the electrical supply to the chip card by the interfacing module, the terminal being kept on.

In one embodiment, a new key intended for encrypting the command for resumption is negotiated between the interfacing module and the chip card after each occurrence of a shutdown, followed by a reimplementation of the electrical supply to the chip card by the interfacing module, the terminal being kept on.

In one embodiment, the utilization by the interfacing module of secure functions offered by the chip card is performed for the implementation by the terminal of communication to a mobile telecommunications network.

In one embodiment, the key intended for encrypting the command for resumption negotiated between the interfacing module and the chip card is further used to encrypt exchanges between the interfacing module and the chip card as part of the utilization by the interfacing module of secure function(s) for the implementation by the terminal of communication to be mobile telecommunications network.

In one embodiment, the interfacing module and the chip card negotiate and store both an encryption key and a signature key, by which the resumption command is signed using the signature key and encrypted using the encryption key, the utilization by the interfacing module of secure functions offered by the chip card being resumed only if the signature of the command for resumption by the interfacing module using the signature key is recognized by the chip card.

According to a second aspect, the invention provides a computer program designed for a chip card comprising instructions for implementing steps, incumbent upon the chip card, of a method according to the first aspect of the invention during the execution of said program on processing means.

According to a third aspect, the invention provides a chip card comprising suitable means for implementing the steps, incumbent upon the chip card, of a method according to the first aspect of the invention.

According to a fourth aspect, the invention provides a terminal module comprising suitable means for implementing the steps, incumbent upon the interfacing module, of a method according to the first aspect of the invention.

According to a fifth aspect, the invention provides a terminal comprising a chip card according to the third aspect of the invention and/or a module according to the fourth aspect of the invention.

BRIEF DESCRIPTION OF THE DRAWINGS

Other characteristics and advantages of the invention will emerge upon reading the following description, which is purely illustrative and must be read in reference to the attached drawings, wherein.

DETAILED DESCRIPTION OF THE EMBODIMENTS

Figure 1:
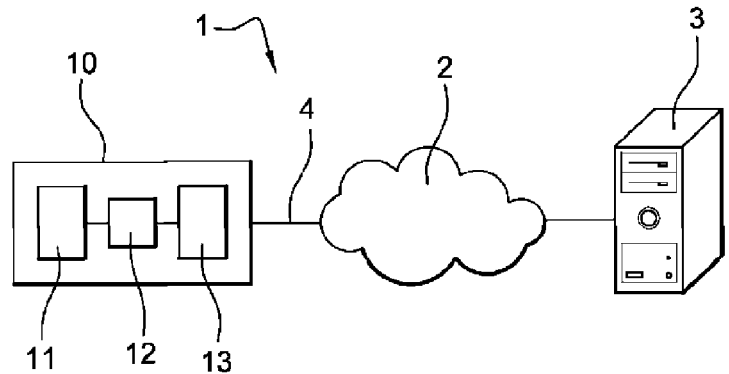
FIG. 1 shows a radio communications system wherein an embodiment of the invention is implemented.

FIG. 1 shows a system 1 in which an embodiment is implemented.

System 1 comprises a radio communications network 2 that connects multiple terminals and servers.

In the remainder of the description, a server 3 is considered to be connected to the network 2, and a mobile terminal 10 is connected to the network 2 by a radio link 4.

The mobile terminal 10 comprises a user interface 11, a removable chip card 13, and an interfacing module 12.

The chip card 13 comprises a memory 14, a random number generator 15, and security functions.

The interfacing module 12 manages exchanges with the chip card for the terminal 10. The interfacing module 12 is particularly suitable for selectively ordering the shutdown or resumption of power to the chip card, while the terminal 10 remains electrically powered itself, usually by a battery appearing in the terminal 10. This is called a local shutdown (and respectively, a local resumption) of power to the chip card, a selective shutdown (and respectively, a resumption) of power to the chip card, the terminal 10 itself remaining switched on.

These security functions that can be executed on the chip card and utilized by the interfacing module include, for example:

a key generator, such as an RSA key generator, based on a random number generator and persistent memory storage of keys;

an RSA key import function, with persistent memory storage;

an RSA key export function, accessible only if the key was defined as extractible at the time of import or generation;

a signature function based on an RSA key;

an encryption function based on an RSA key;

a function for authenticating a PIN code stored on the chip card;

a function for unlocking using single-use codes, available in the event of a locked PIN code;

a function for authenticating with another chip card;

functions for storing data in persistent memory, used by the box to store symmetric keys and certificates.

These functions are available only when the card is unlocked.

Figure 2:
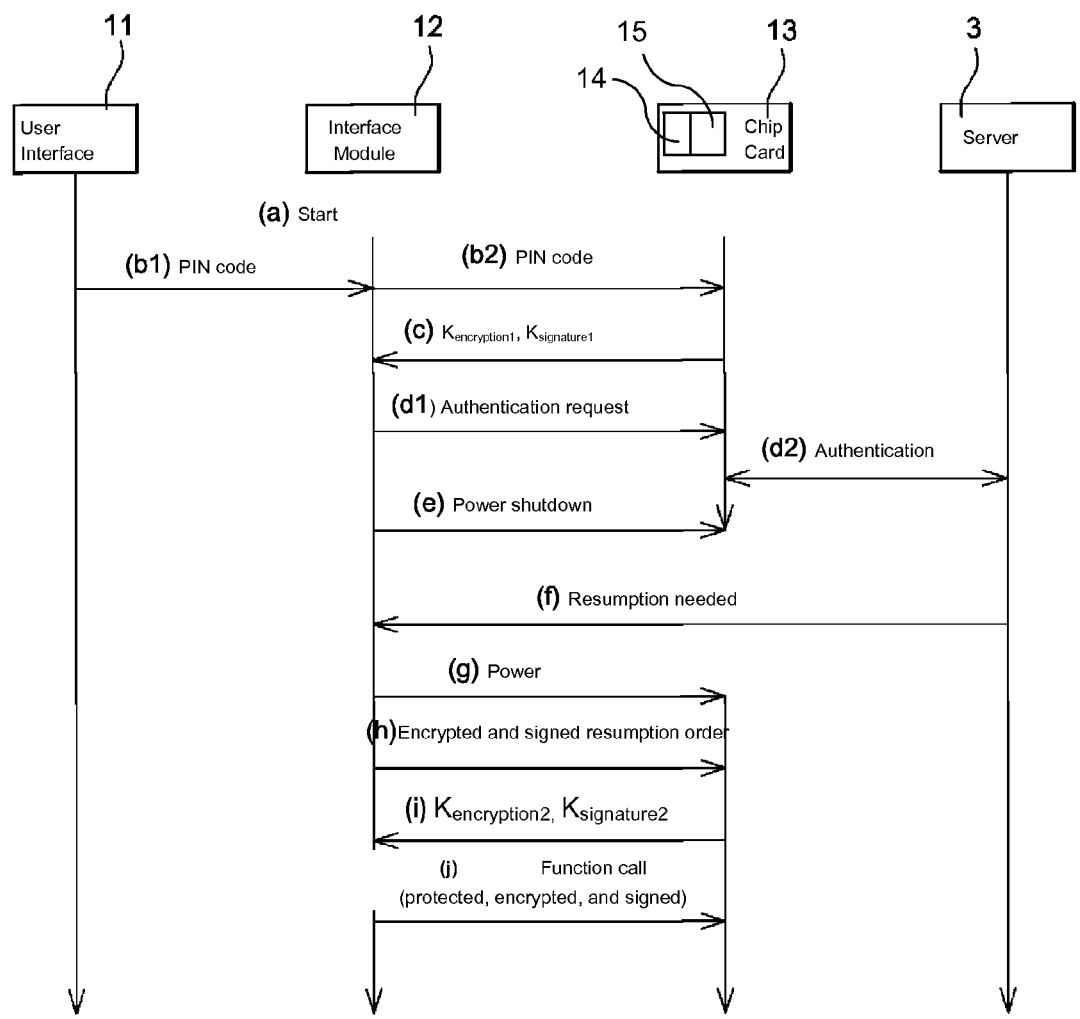
FIG. 2 is a chart showing the steps in an embodiment of a method according to the invention.

With reference to the chart in FIG. 2, showing exchanges between the user, the terminal 10 comprising the user interface 11, the interfacing module 12, the chip card 13, and the network server 13, the following steps are implemented.

In one embodiment, these steps are implemented following the execution, on processing means, of instructions from a computer program.

When the terminal 10 is started (step a), the terminal and the chip card both being electrically powered, the PIN code must be entered by the user by means of the user interface 11. When the user interface received a code entered by the user, such as on a keyboard provided by the terminal 10 (step b1), this entered code is supplied to the chip card 13 by the interfacing module 12.

Only if the chip card identifies this received code as being equal to the PIN code stored on the card, the interfacing module 12 is allowed to use the secure functions offered by the chip card for the implementation of services provided by the terminal, such as a prior authentication step between the terminal 10 and the network.

In the considered embodiment, an encryption key $K_{encryption1}$ and a signature key $K_{signature1}$ are generated by the chip card 13 and supplied by the chip card 13 to the interfacing module 12 (step c). These keys are stored by the chip card 13 in persistent memory (i.e. a storage space whose data, once written, is kept permanently, even in the event of a power shutdown) and by the interfacing module 13 in non-persistent memory (i.e. a storage space whose data, once written, is not kept permanently and it erased, for example, in the event of a power shutdown).

Furthermore, when it is necessary to perform a step to authenticate the terminal 10 and the network server 3 to implement services (ex.: emails and telephone calls), a call to implement the authentication function on the chip card is made from the interfacing module 12 to the chip card 13 (step d1), encrypted and signed using $K_{encryption1}$ and $K_{signature1}$, respectively. The reciprocal authentication steps between the terminal 10 and the server 3 are carried out using data stored on the chip card 13 regarding the authentication between the terminal 10 and the server 3, and some secure functions on the chip card 13 (step d2), including functions for encrypting and signing the RSA key (other than $K_{encryption1}$ and $K_{signature1}$). All interactions between the terminal and the card (in both directions) are encrypted and signed using $K_{encryption1}$ and $K_{signature1}$, respectively.

A local shutdown of power to the chip card 13 is then ordered by the interfacing module 12, such as after a predetermined length of time during which no calls to secure functions on the chip card are made (step e). The chip card then cannot be used by the terminal 10.

Later, the interfacing module 12 is required to call to a security function offered by the chip card 13 (step f), such as following a request by the server 3 for a reauthentication by the terminal 10 of the network 2, or even following the receipt of a secure call requiring the authentication of a remote terminal.

Before the interfacing module 12 calls the chip card 13 to use the required security function, it performs the steps g and h specified below.

Therefore, the interfacing module 12 ordered the local return of electric power from the chip card 13 (step g).

Next, the interfacing module 12 uses the $K_{encryption1}$ and $K_{signature1}$ keys it stored to encrypt and sign a command requiring the resumption by the interfacing module 12 of the utilization of one or more secure functions offered by the chip card 13. The chip card 13 authorizes this utilization only if the signature of the interfacing module using the signature key $K_{signature1}$ stored on the chip card 13 is successfully recognized and if the command decrypted using the encryption key $K_{encryption1}$ is also recognized (step h).

Furthermore, if this utilization was authorized, a new encryption key $K_{encryption2}$ and a new signature key $K_{signature2}$ are generated by the chip card 13, and supplied by the chip card 13 to the interfacing module 12 (step i), like in step c. They are stored by the chip card 13 and by the interfacing module 12, and they will be used in the same manner at the keys $K_{encryption1}$ and $K_{signature1}$ during the next occurrence of a local shutdown/resumption of electrical power to the chip card 13.

In a step j, if the utilization of secure functions was authorized at the end of the step h, the interfacing module 12 uses the secure function required by means of the chip card 13, by encrypting and signing the function call, with $K_{encryption2}$ and $K_{signature2}$ respectively.

More generally, exchanges between the interfacing module 12 and the chip card 13, required for this utilization of the secure function, are encrypted and signed with the keys $K_{encryption2}$ and $K_{signature2}$.

Thus, the proposed solution allows for the user to be asked for a PIN code when the terminal starts up in order to negotiate an encryption key and a signature key between the terminal and the chip card, the encryption key and the signature key both being single-use keys. These keys are stored persistently on the chip card. It implements a resumption function, using a command such as an APDU command that has been encrypted and signed using the keys. If the function is successful, access to protected functions is authorized.

This allows the terminal to unlock the chip card without needing the PIN code.

This solution has the following advantages:

The PIN code is not stored outside of the chip card.

The power to the chip card can be cut without an impact to the operation or ergonomics of the terminal.

The user only has to enter a PIN code at the start of the action.

The only data stored on the terminal outside of the chip card in the considered embodiment are the keys $K_{encryption}$ and $K_{signature}$, which are single-use keys, for example. They are automatically renewed, and the card, for example, allows only one attempt before invalidation if it does not recognize either of these two keys.

The communication channel between the interfacing module and the card is encrypted.

In other embodiments, the keys are encryption and/or signature keys that are limited to n attempts of the resumption function, each after a respective episode of cutting/resuming the local power to the chip card, with n being a predetermined integer that is greater than or equal to 1.

In another embodiment, the order of resumption is only signed or only encrypted, and therefore a single key is negotiated and used for a local shutdown/resumption of the electrical power to the chip card.

In the embodiment described above, the implementation of a functionality of the terminal (the authentication steps d1-d2 above with the server) calling a security function on the chip card was performed after the step (step c) for negotiating the keys $K_{encryption1}$, $K_{signature1}$. In another embodiment, the step c is performed after the steps d1 and d2. The step (step c) for negotiating the keys $K_{encryption1}$, $K_{signature1}$ are performed before the local shutdown of power to the chip card (step e).

Similarly, the step i in another embodiment is performed only after the step j and prior to a subsequent shutdown of local power to the chip card.

The invention claimed is:

1. A security method in a terminal comprising a chip card offering secure functions, a user interface, an interface module for interface with the chip card and operable for at least shutting down or introduction of an electrical supply to the chip card, the method comprising the steps of:
receiving a code through the user interface of the terminal;
receiving the code by the chip card from the interface module;

verifying by the chip card that the code is equal to an access code and utilizing by the interface module the secured functions offered by the chip card on verification of the code;

negotiating between the interface module and the chip card of at least one key ($K_{encryption1}$, $K_{signature1}$);

storing said at least one negotiated key by the interface module and by the chip card;

shutting down and introducing the electrical supply to the chip card by the interface module with the terminal kept switched on;

encrypting a command for resuming the utilization of the secure functions by the interface module with said at least one negotiated key stored in the interface module;

receiving said encrypted command by the chip card from the interface module;

decrypting said encrypted command by the chip card using said at least one negotiated key stored in the chip card; and utilizing by the interface module of the secure functions of the chip card when said encrypted command decrypted by the chip card is recognized as a resumption command by the chip card.

2. The method of claim 1, further comprising the steps of performing the steps of encrypting, receiving said encrypted command, decrypting and utilizing at each occurrence of a shutdown and re-introduction of the electrical supply to the chip card by the interface module while the terminal is kept switched on.

3. The method of claim 2, further comprising the step of negotiating at least one new key ($K_{encryption2}$, $K_{signature2}$) for encrypting the command for resumption between the interface module and the chip card, after each occurrence of a shutdown and reintroduction of the electrical supply to the chip card by the interface module while the terminal is kept switched on.

4. The method of claim 1, further comprising the step of utilizing the secure functions of the chip card by the interface module to communicate with a mobile telecommunications network.

5. The method of claim 1, further comprising the step of utilizing said at least one negotiated key ($K_{encryption1}$, $K_{signature1}$) to encrypt exchanges between the interface module and the chip card as part of the utilization of the secure functions of the chip card by the interface module to communicate with a mobile telecommunications network.

6. The method of claim 1, wherein the interface module and the chip card negotiate and store both an encryption key ($K_{encryption1}$) and a signature key ($K_{signature1}$); and further comprising the steps of:

utilizing the signature key to sign the command for resumption by the interface module;

encrypting the command for resumption using the encryption key by the interface module; and resuming the secured functions by the interface module when the signature of the command for resumption by the interface module using the signature key is recognized by the chip card.

7. A chip card comprising a memory for storing computer executable code for offering secure functions after at least shutdown or introduction of electric supply to the chip card, the computer executable code comprising instruction for:

receiving a code through a user interface of the terminal;

receiving the code by the chip card from an interface module of the terminal;

verifying by the chip card that the code is equal to an access code and utilizing by the interface module the secured functions offered by the chip card on verification of the code;

negotiating between the interface module and the chip card of at least one key ($K_{encryption1}$, $K_{signature1}$);

storing said at least one negotiated key by the interface module and by the chip card;

shutting down and introducing the electrical supply to the chip card by the interface module with the terminal kept switched on;

encrypting a command for resuming the utilization of the secure functions by the interface module with said at least one negotiated key stored in the interface module;

receiving said encrypted command by the chip card from the interface module;

decrypting said encrypted command by the chip card using said at least one negotiated key stored in the chip card; and utilizing by the interface module of the secure functions of the chip card when said encrypted command decrypted by the chip card is recognized as a resumption command by the chip card.

8. A chip card for use with terminal and for offering secure functions after at least shutdown or introduction of electric supply to the chip card, the chip card comprising:

a key generator for generating keys;

a memory for storing an access code;

wherein the chip card receives a code entered on a user interface of the terminal via an interface module of the terminal; verifies that the code is equal to the access code stored in the memory; authorizes the interface module to utilize the secure functions on verification of the code; negotiates said at least one key ($K_{encryption1}$, $K_{signature1}$) with the interface module; and stores at least one negotiated key in the memory;

wherein the electrical supply is introduced to the chip card after shutdown by the interface module with the terminal kept switched on;

wherein the chip card receives an encrypted command from the interface module, decrypts the encrypted command using said at least one negotiated key stored in the memory, wherein the encrypted command being a command for a resumption of the utilization of the secure functions by the interface module using said at least one negotiated key stored by the interface module; and wherein the chip card authorizes the interface module to utilize the secure functions when the chip card recognizes the encrypted command as a resumption command.

9. A terminal for utilizing secure functions offered by a chip card, after at least shutdown or introduction of electric supply to the chip card, the terminal comprising:

a user interface for receiving a code from a user;

an interface module for interfacing with the chip card and supplying the code to the chip card;

wherein the chip card verifies that the code is equal to an access code; authorizes the interface module to utilize the secure functions on verification of the code; negotiates at least one key ($K_{encryption1}$, $K_{signature1}$) with the interface module; and stores at least one negotiated key;

wherein the interface module stores said at least one negotiated key; introduces the electrical supply to the chip card after the shutdown of the chip card with the terminal kept switched on; and encrypts a command for a resumption of the utilization of the secure functions by the interface module using said at least one negotiated key stored in the interface module;

wherein the chip card receives the encrypted command from the interface module and decrypts the encrypted command using said at least one negotiated key stored in the chip card; and wherein the interface module utilizes the secure functions when the chip card recognizes the encrypted command as a resumption command.

10. The terminal of claim 9, wherein the chip card comprises a key generator for generating keys, and a memory for storing the access code and said at least one negotiated key; and wherein the terminal comprises the chip card.

11. The terminal of claim 9, wherein the interface module utilizes the secure functions to communicate with a telecommunications network.

12. The terminal of claim 9, wherein said at least one negotiated key ($K_{encryption1}$, $K_{signature1}$) is utilized to encrypt exchanges between the interface module and the chip card as part of the utilization of the secure functions of the chip card by the interface module to communicate with a mobile telecommunications network.

* * * * *